Figure 1:
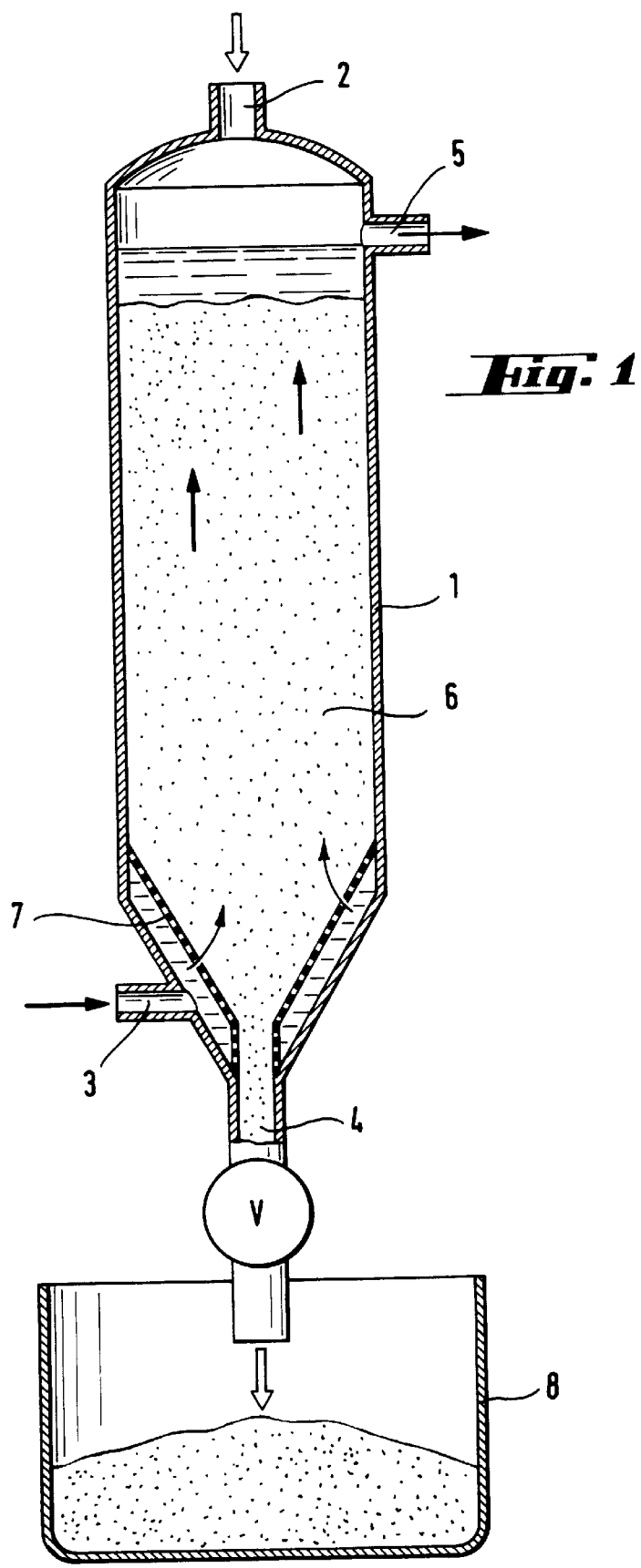

United States Patent
Thüer et al.

[11] Patent Number: 5,824,221
[45] Date of Patent: Oct. 20, 1998

[54] WATER PURIFICATION PROCESS

[75] Inventors: Markus Thüer, Rheinfelden; Gerhard Stucki, Ormalingen; Michael Reisinger, Himmelried, all of Switzerland

[73] Assignee: Ciba Specialty Chemicals Corporation, Tarrytown, N.Y.

[21] Appl. No.: 26,914

[22] Filed: Mar. 5, 1993

[30] Foreign Application Priority Data

Nov. 3, 1992 [CH] Switzerland .................. 00 785/92

[51] Int. Cl.$^6$ ...................................................... C02F 3/08
[52] U.S. Cl. .................... 210/605; 210/610; 210/617; 210/631; 210/908
[58] Field of Search ............................ 210/617, 616, 210/618, 631, 605, 694, 908, 909

[56] References Cited

U.S. PATENT DOCUMENTS

| | | | |
|---|---|---|---|
| 4,126,546 | 11/1978 | Hjelmnér et al. | 210/19 |
| 4,197,201 | 4/1980 | Hjelmnér et al. | 210/189 |
| 4,202,770 | 5/1980 | Gappa et al. | 210/96.1 |
| 5,264,128 | 11/1993 | Thüer et al. | 210/610 |

FOREIGN PATENT DOCUMENTS

| | | |
|---|---|---|
| 0430886 | 6/1991 | European Pat. Off. . |
| 256319 | 7/1959 | German Dem. Rep. . |
| 2708340 | 9/1977 | Germany . |
| 3222969 | 12/1983 | Germany . |
| 3816679 | 11/1989 | Germany . |

OTHER PUBLICATIONS

A.M. Cook in Experientia 39 p. 1191 (1983).
Xanthobacter autotrophicus GJ 10 D.B. Janssen, Applied and Environmental Microbiology, 49 p. 673 (1985).
De 2 (G. Stucki, Experentia 39 p. 1271 (1983).
Derwent Abstract, No. 88–264550/38.
Derwent Abstract, No. 84–000819/01.
Derwent Abstract, No. 89–349143/48.

*Primary Examiner*—Thomas G. Wyse
*Attorney, Agent, or Firm*—Kevin T. Mansfield

[57] ABSTRACT

A process for purifying water, which comprises passing water contaminated with organic compounds in countercurrent through a moving bed adsorber packed with an adsorbent medium that is colonized, especially in the lower zone, with one or more microorganisms.

19 Claims, 1 Drawing Sheet

WATER PURIFICATION PROCESS

The present invention relates to a novel process for the purification of water contaminated with organic, especially halogenated, compounds by a moving bed adsorber, and to a means for carrying out said process.

In a moving bed adsorber the water to be treated flows through a cylindrical vessel upwards from below. The cylinder itself contains a suitable adsorbent. The water flowing into the cylinder loads the adsorbent with the contaminants first in the lower zone. When the capacity of the adsorbent in this lower zone has fallen below a critical value, this spent portion can be discharged and replaced by fresh adsorbent from above. The feed of adsorbent and the water to be treated is thus operated in countercurrent, i.e. the most severely contaminated water comes in contact with the adsorbent which is most heavily loaded with contaminants, and the cleaner water with the adsorbent that is less heavily loaded with contaminants. In the standard prior art fixed-bed processes, the spent portion of the adsorbent has always had to be replaced after short intervals.

Another process comprises colonizing the entire adsorbent zone with microorganisms. The adsorbent is used in this process solely as carrier for the microorganisms, whereby usually only a biodegradation but not an adsorption is effected. For this reason these biological purification steps are normally followed by separate adsorption steps in which the adsorbent is then completely replenished as required.

The process of this invention comprises passing contaminated water in countercurrent through a moving bed adsorber containing an adsorbent that is colonized in particular in the lower zone with one or more microorganisms.

The inventive feature of colonizing one zone of the adsorber with microorganisms enables the bulk of the organic, especially halogenated, hydrocarbons with which the water is contaminated to be biodegraded, thereby substantially prolonging the lifetime of the adsorbent.

Within the context of this invention, the expression "contaminated water" will be understood as comprising contaminated ground-water of wide provenance, typically ground-water, surface water, leachates, domestic effluent, strong sewage, process effluent, industrial wastewater, and mixtures of these effluents.

The organic, in particular halogenated, compounds with which the water is contaminated are preferably halogenated hydrocarbons. These halogenated hydrocarbons may belong to the class of the aliphatic and also of the aromatic hydrocarbons. The hydrocarbons will preferably contain up to 9 carbon atoms and are substituted by one or more halogen atoms, especially by chlorine atoms. The following non-limiting list of halogenated hydrocarbons will serve to illustrate these compounds: carbon tetrachloride, chloroform, 1,1,2,2-tetrachloroethane, 1,1,1-trichloroethane, 1,2,3-trichloropropane, tetrachloroethene, trichloroethene, cis- and trans-1,2-dichloroethene, 1,1-dichloroethene, cis-1,3-dichloropropene, 1,2-dichlorobenzene, 1,3-dichlorobenzene, 1,4-dichlorobenzene, 3-chlorotoluene and bromobenzene, especially 1,2-dichloroethane and dichloromethane.

The concentrations of the biodegradable compounds, measured in TOC (total organic carbon), is preferably 10 $\mu$g/l to 10 g/l of water, and the concentration of biologically non-degradable organics is 1 $\mu$g/l to 10 g/l of water.

The bacterial degradation can be effected aerobically in less severely contaminated water and anerobically in more severely contaminated water. Most preferably, the concentration of biodegradable halogenated compounds, measured in TOC, for anaerobic degradation is in the range from 100 $\mu$g/l to 1 g/l of water, and for aerobic degradation from 100 $\mu$g/l to 100 mg/l of water.

The possible adsorbents have a large surface area (0.1–1000 m$^2$/g) and particle sizes of 0.2–50 mm, preferably 0.5–5 mm. A preferred adsorbent is activated carbon.

It is also possible to connect any anaerobic adsorber upstream of an aerobically operated moving bed adsorber.

During the operation, the activated sludge that forms at the bottom end of the moving bed adsorber is removed together with spent activated carbon (e.g. ¼ of the entire volume of carbon) and replenished with fresh activated carbon from above.

The degradation of the biodegradable compounds at the inlet of the moving bed adsorber results in the creation of a concentration gradient of these biodegradable compounds. Depending on the concentration of degradable compounds, favorable conditions result when the loading of the reactor is chosen such that bacterial growth on the moving bed adsorber remains restricted to the lower half, preferably the lower third, of the reactor.

The microorganisms eligible for use in the practice of this invention can be obtained in numerous ways. The microorganisms may also be mixed populations. Useful microorganisms can be isolated from sewage sludge or contaminated soil, or else they are used preferably as pure culture. Details on the isolation and cultivation of microorganisms will be found in the article by A. M. Cook et al in Experientia 39, p. 1191 (1983), and constitute part of this description. Particularly suitable microorganisms for degrading halogenated aliphatic compounds are *Xanthobacter autotrophicus* GJ 10 (D. B. Janssen et al, Applied and Environmental Microbiology, 49, p. 673 (1985)) and strain DE2 (G. Stucki et al, Experentia 39 p. 1271 (1983)).

Owing to the nutrient and possible oxygen requirement of the microorganisms it may be necessary to add the requisite nutrients, conveniently in the form of inorganic salts, to the water before passage through the reactor, and also to increase the oxygen concentration of the water by the metered addition of nitrate or $H_2O_2$. The "oxygen" will preferably be added as a solution of $H_2O_2$ in water which, depending on the flow rate of the water and on the metering devices, is added in a concentration of 0.5–30%.

It can happen that severely contaminated or weakly buffered water becomes overacidified at the exit of the reactor, as the degradation of the halogenated compounds results in an increase of the halide concentration. In such a case it is convenient to add a base such as $NaHCO_3$ to the water, preferably upstream of the moving bed adsorber, or to recycle a partial stream which is buffered by a pH controller. The amount of base to add to the water upstream of the moving bed adsorber or to the partial recycle stream should be adjusted so that the pH on the outlet side of the reactor is between 6.0 and 8.5.

For retention of undesirable components, further treatment steps, e.g. with solids separators, can be carried out upstream of the moving bed adsorber.

A portion of the effluent can be recycled to the adsorber. To control the pH, bases can be added to this recycled partial stream.

The process can be carried out in a temperature range from typically 5° to 60° C., preferably from 7° to 38° C.

The moving bed adsorber (q.v. FIG. 1) used for carrying out the process normally comprises:
a) a container (1) equipped as receiver for the adsorbent,
b) a feed (2) for the adsorbent in the upper zone of the container, c) a feed (3) for contaminated water, especially in the lower zone of the container, d) an outlet (4) for the spent adsorbent at the bottom end of the container, e) an outlet (5) for the purified water in the upper zone of the container, f) an adsorbent (6) in the container that is colonized preferably in the lower zone with microorganisms, and optionally g) a separating sieve (7) that separates the adsorbent from the water.

To measure the purification capacity, a suitable measuring apparatus, e.g. for determining the TOC concentration, can be provided at the outlet (5) for the purified water.

The spent adsorbent is collected in a container (8) and regenerated or disposed of.

A preferred fixed bed adsorber is one whose lower zone tapers to a pointed cone and in which the ratio of diameter to height is 1:2 to 1:10, the range from 1:3 to 1:6 being especially preferred.

Before passage through the moving bed adsorber, nutrient and oxygen-containing substances can be added to the contaminated water by a suitable means.

The invention is illustrated in more detail by the following non-limiting Examples.

EXAMPLE 1

To shorten the loading time, 80.4 g of activated carbon F400 (Chemviron) are stirred with 750 g of 1,2-dichloroethane (DCE) in 500 ml of water for 4 hours so as to give a loading of 10 mg of DCE per gram of activated carbon. The activated carbon is inoculated with a DCE degrading microorganism (*Xanthobacter autotrophicus*) and charged to a moving bed adsorber of glass (2 cm diameter, 8 cm cone length) to a height of 28 cm. Then 3.5 to 4 liters of water containing 5 to 6.5 mg/l of DCE, 0.87 mg/l of ammonium phosphate and 0.5 ml/l of a vitamin solution (q.v. Table 1, column 3), are passed per day through the moving bed adsorber.

In the course of the experiment, a brown coloration caused by bacterial growth is observed in the lower zone of the column, whereas in the upper zone no growth on the activated carbon is observed.

EXAMPLE 2

The procedure of Example 1 is repeated, but without inoculating the activated carbon with microorganisms (q.v. Table 1, column 2).

TABLE 1

| Day | without microorganisms conc. in mg/ml DCE | with microorganisms conc. in mg/ml DCE |
|---|---|---|
| 1 | 4.3 | 5.0 |
| 6 | 6,4 | 5.8 |
| 16 | 5.1 | 5.1 |
| 48 | 6.0 | 0.2 |
| 57 | 5.2 | 0.3 |
| 58 | 0.1 | — |
| 61 | 1.3 | — |
| 62 | 2.6 | — |
| 63 | 3.7 | — |
| 64 | 3.8 | — |
| 65 | 0.04 | 0.2 | carbon replacement in adsorber without microorganisms

TABLE 1-continued

| Day | without microorganisms conc. in mg/ml DCE | with microorganisms conc. in mg/ml DCE |
|---|---|---|
| 68 | — | 0.2 |
| 76 | — | 0.2 |
| 83 | — | 0.2 |
| 90 | — | 0.3 |
| 97 | — | 0.2 |

EXAMPLE 3

Ground-water is pumped from a well to a 5 m³ stirred reactor by an immersion pump and mixed with a nutrient salt solution (concentration: 1–3 m/g of nitrogen (N) in the form of ammonium ions and 1–3 mg/l of phosphorus in the form of phosphate ions).

The ground-water is freed from undissolved solids in a dual media filter and then pumped to a moving bed adsorber.

Before passage through the moving bed adsorber, 35% $H_2O_2$ (oxygen source) is added to the ground-water. As the ground-water itself contains no organic pollutants, a mixture of alkylated and chlorinated aromatics is added (5–15 mg/l TOC).

The moving bed adsorber is characterized as follows:

height: 3.1 m internal diameter: 0.5 m adsorbent: granular activated carbon (CHEMVIRON, F400, 130 kg)

hydraulic capacity: 800 l/h operating time: 36 weeks

The following results are obtained using main flow concentrations of 0.1 to 15 mg/l per single substance and mean residence times (based on the volume of activated carbon) of at most 20 minutes.

chlorobenzene <5 $\mu$g/l 1,2-dichlorobenzene <5 $\mu$g/l 1,3-dichlorobenzene <5 $\mu$g/l 1,4-dichlorobenzene <5 $\mu$g/l 1,2,4-trichlorobenzene <5 $\mu$g/l Adsorption isotherms are recorded from the mixture of chemicals. It follows therefrom that, at a concentration of 0.4 mg/l in the discharge, the adsorption in g of TOC per g of activated carbon is 0.06%. In the present instance, the concentrations of <0.005 mg/l in the discharge are much lower. This means that the adsorption of 0.06% is clearly the best case. If the activated charcoal packing is 130 kg, then it would only be possible to adsorb about 0.078 kg and the packing would have to be replaced by a fresh one. In fact, 53.2 kg of a mixture of chemicals are eliminated using a single packing. Stated in figures, this result represents an adsorption of 40.9% and is hence a multiple of the purification capacity estimated from the adsorption isotherms.

The difference is evidently attributable to the active biodegradation on the activated carbon. In this degradation the pollutants are mineralized to water, carbonic acid and hydrochloric acid. The degradation can be substantiated by the fact that the difference in the chloride concentration between feed and discharge matches exactly the calculated chlorine content of the mixture of chemicals. If the supply of oxygen is discontinued, more than 90% of the chlorinated compounds remain non-degraded.

EXAMPLE 4

Contaminated ground-water is pumped by an immersion pump from a well to the top inlet of a dual media filter and freed from undissolved solids as it flows through the filter.

Auxiliary chemicals (nitrogen, phosphorus, oxygen) are added to the feed. The layers consist of coarsely particulate pumice on the top and of finely particulate quartz sand underneath.

Technical data of the dual media filter height: 3.6 m internal diameter: 0.7 m packing layer top: 155 kg of pumice packing layer bottom: 360 kg of quartz sand In normal operation the clarified water flows in free overflow into the bottom feed inlet of a first moving bed adsorber, which is packed with granular activated carbon. The pollutants dissolved in the ground water are eliminated by biodegradation and adsorption.

The purified water flows in free overflow into a second identical moving bed adsorber which is 0.5 m lower. This second adsorber functions primarily as a safety filter: Should it happen that, despite regular sampling and analysis in the first adsorber, pollutants unexpectedly slip through, this water will not flow into the receiving stream but through this second carbon adsorber. Now, at the latest, a portion of the activated carbon in the first moving bed adsorber must be replaced by fresh carbon. Just beneath the feed inlet of the column there is a slide gate which permits the easy replacement of spent activated carbon. The same amount of fresh carbon must then again be charged from above to the moving bed adsorber. In addition, when replacing the activated carbon of the first moving bed adsorber by the appropriate valve settings, the discharge from the dual media filter can be passed direct through the second moving bed adsorber so that no interruption is necessary. If the discharge of the second moving bed adsorber is above the prescribed concentrations, then the carbon must also in this case be replaced.

Technical data of moving bed adsorber I height: 3.6 and 3.1 m internal diameter: 0.5 m packing: granular activated carbon (CEMVIRON, Type F400 130 kg)

The discharge of the second moving bed adsorber flows into a tank which has an overflow into the rain water conduit. The contents of the tank are used as a sampling point and as a receiver for return water.

What is claimed is:

1. A process for purifying water contaminated with organic compounds, which comprises passing said contaminated water upwardly in countercurrent through both zones of a reactor containing a moving bed adsorber having an upper and lower adsorption zone and containing an adsorbent that is colonized with one or more microorganisms in said lower zone, and removing adsorbent colonized with one or more microorganisms and loaded with contaminants together with activated sludge from the bottom end of said lower zone and adding fresh adsorbent from above to said upper adsorption zone that is not colonized with microorganisms.

2. A process according to claim 1, wherein the contaminated water contains biodegradable compounds in a concentration, measured in TOC, of 10 $\mu$g/l to 10 g/l of water, and non-biodegradable organics in a concentration of 1 $\mu$g/l to 10 g/l of water.

3. A process according to claim 1, wherein the concentration of biodegradable compounds, measured in TOC, for anaerobic degradation is in the range from 100 $\mu$g/l to 1 g/l of water, and for aerobic degradation from 100 $\mu$g/l to 100 mg/l of water.

4. A process according to claim 1, wherein the biodegradable compounds are halogenated compounds.

5. A process according to claim 4, wherein the halogenated compounds are halogenated hydrocarbons.

6. A process according to claim 5, wherein the halogenated hydrocarbons contain not more than 9 carbon atoms.

7. A process according to claim 5, wherein the halogenated hydrocarbons are chlorinated and/or brominated hydrocarbons.

8. A process according to claim 5, wherein the halogenated hydrocarbon is 1,2-dichloroethane.

9. A process according to claim 1, wherein the absorbent is activated carbon.

10. A process according to claim 1, wherein the adsorbent has a surface area of 0.1–1000 m$^2$/g and a granular size of 0.2–50 mm.

11. A process according to claim 1, wherein the moving bed adsorber having an upper and lower adsorption zone is an aerobic moving adsorber and an anaerobic adsorber is connected in series upstream of said aerobic moving adsorber.

12. A process according to claim 1, wherein the adsorbent colonized with one or more microorganisms and loaded with contaminants together with activated sludge is removed from the bottom end of the lower zone and fresh adsorbent is added to the upper zone at a rate such that bacterial growth on the moving bed adsorber remains restricted to the lower third of the reactor.

13. A process according to claim 1, wherein the microorganisms are obtained from a pure culture from sewage sludge or from contaminated soil.

14. A process according to claim 13, wherein the microorganisms are obtained from a pure culture.

15. A process according to claim 1, wherein nutrients and oxygen or an oxygen-containing substance are added to the contaminated water before passage through the moving bed adsorber and also, if the pH is not between 6.0 and 8.5, it is adjusted to be within that range by adding an acid or base thereto.

16. A process according to claim 15, wherein hydrogen peroxide is added to the water.

17. A process according to claim 15, wherein nitrate is added to the water.

18. A process according to claim 1, wherein a base is added to the water.

19. A process according to claim 1, wherein water contaminated with 1,2-dichloroethane is passed through a moving bed adsorber packed with activated carbon, which activated carbon is inoculated with microorganisms obtained from a pure culture, and nutrients and H$_2$O$_2$ are added to the water upstream of the moving bed adsorber.

* * * * *